Nov. 9, 1948.   J. R. KING   2,453,518
HOLDER FOR ARTIFICIAL TEETH
Filed Jan. 30, 1946
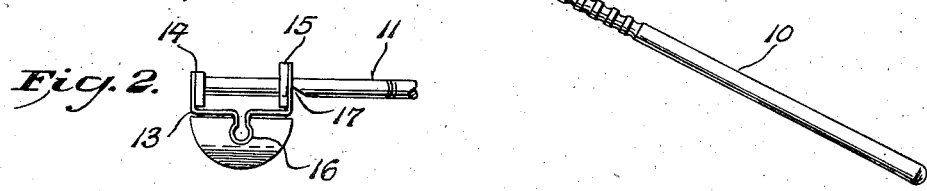
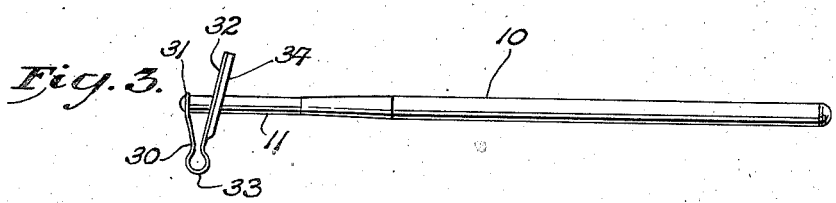
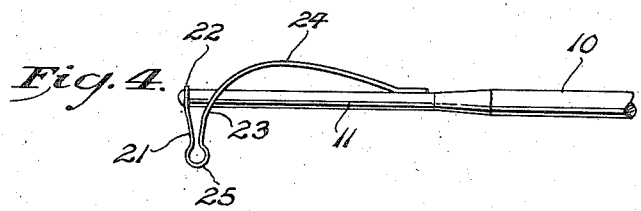
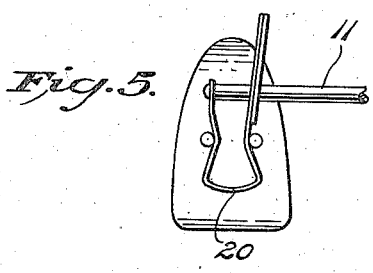
INVENTOR.
James R. King
BY W. S. McDowell
ATTORNEY Patented Nov. 9, 1948

2,453,518

UNITED STATES PATENT OFFICE 2,453,518

HOLDER FOR ARTIFICIAL TEETH

James R. King, Florence, S. C., assignor to The Columbus Dental Manufacturing Company, Columbus, Ohio, a corporation of Ohio Application January 30, 1946, Serial No. 644,205

3 Claims. (Cl. 32—68)

My invention relates to dental instruments and, more particularly, to dental tools adapted to hold artificial teeth.

In the dental laboratory or dental office, there is a particular need for an instrument for the holding of artificial teeth; especially in comparing the color and surface textures of artificial teeth to that of natural teeth so as to insure of a similarity between the two. To accomplish this similarity of color and texture, it becomes necessary for a dentist or technician to apply a harmonious matching glaze to the surface of the artificial teeth to be fitted. For example, in the use of glazes, when the technician applies a mixture of distilled water and powdered glaze particles to an artificial tooth with a camel's hair brush, the mixture has a tendency to streak, thus presenting thick and thin areas and before the artificial tooth may be fitted, it is necessary to eliminate such streaking.

It is, therefore, an object of my invention to provide an artificial tooth holder which provides means for vibrating an artificial tooth during a glazing process, thereby insuring an even coating of the glaze over the external surfaces of the tooth.

It is another object of my invention to provide an artificial tooth holder which, by nature of its construction, provides a firm holding support for an artificial tooth during comparison processes with natural teeth, and during the application of glaze thereto.

For a further understanding of the invention, reference is to be had to the following description and the accompanying drawing, wherein:

Fig. 1 is a perspective view of my improved tooth holder;

Fig. 2 is a fragmentary plan view on an enlarged scale showing the head end of the holder;

Fig. 3 is a plan view of a modified form of holder;

Fig. 4 is a similar view of a further modification;

Fig. 5 is a rear elevational view of another modified form of my improved holder.

In the following description, where reference is made to an artificial tooth, I intend to include with its definition artificial tooth facings and pontics.

As shown in the drawings, my holder comprises a serrated handle 10, an angularly bent shank 11, and a resilient clip 12.

The resilient clip 12 comprises a substantially U-shaped spring strip 13, made of any resiliently suitable metal, there being two non-resilient supports 14 and 15 attached to the ends of the spring strip 13. The support 14 is rigidly attached to the end of the shank 11 and the support 15 is resiliently movable along the shank 11.

The spring strip 13 is shaped so as to prevent compression of the supports 14 and 15, and provides a tubular attaching means 16 at its apex, said attaching means 16 adapted by its configuration to fit within the supporting channel of an artificial tooth.

When the resilient clip 12 is compressed, the support 15 moves on the shank 11 toward the support 14, causing the attaching means 16 to be contracted so as to freely fit within the holding channel of an artificial tooth. Correspondingly, when pressure is released from the resilient clip 12, the support 15 moves away from the rigidly attached support 14, thereby expanding the attaching means 16 within the supporting channel of the artificial tooth and causing a resiliently firm union between the holder and the tooth.

The handle 10 contains a multiplicity of serrations 10a thereon, said serrations serving to produce vibration throughout the holder when frictionally rubbed by an oppositely serrated object, thereby permitting a wet glaze applied to the surface of an artificial tooth to settle in a smooth uniform manner over the contours of the surface.

As shown in Figs. 1 and 2 of the drawings, the shank 11 provides a retaining groove 17 adapted to receive and lock the resiliently movable support 15 when the resilient clip 12 is expanded, thereby insuring a locked union between the attaching means 16 and an artificial tooth.

Fig. 3 of the drawings discloses a modification of the resilient clip wherein an angularly bent spring strip 30 forms a pair of legs 31 and 32 and a tubular attaching means 33 at its apex. The leg 31 is rigidly attached to the end of the shank 11 and the leg 32 resiliently movable along the shank. The resiliently movable leg 32 is extended beyond the shank 11 and is reenforced by a non-resilient support 34 attached thereon. The spring clip 30 is compressed by moving the resiliently movable leg 32 toward the attached leg 31. In turn, the attaching means 33 is contracted so as to freely fit within the holding channel of an artificial tooth. When the pressure applied to the leg 32 is released, the attaching means 33 is expanded within said channel so as to cause a firm union between the tooth and the holder.

Fig. 5 of the drawings discloses still another modified form of the resilient clip, said clip comprising a relatively U-shaped spring strip 20 having one end rigidly attached to the end of the shank 11 and the other end resiliently movable on the shank 11. This modification of the clip is adapted for use with artificial teeth having projection studs as a supporting means. The spring strip 20, when compressed, fits between the supporting studs of the artificial tooth, and when released serves to resiliently hold the tooth by its supporting studs.

Fig. 4 of the drawings discloses another modification of the resilient clip, wherein the resilient clip comprises a spring strip 21 having a fixed leg 22 and a resiliently movable leg 23, said movable leg 23 being extended to form a compressible loop 24 and being rigidly attached at the juncture of the handle 10 and the shank 11. A tubular attaching means 25 is provided at the apex of the legs 22 and 23 and is adapted when contracted to fit within the supporting channel of an artificial tooth, and when expanded to resiliently hold the tooth. The contraction of the attaching means 25 is caused by the application of pressure upon the compressible loop 24, and when pressure is released from said loop 24, the attaching means 25 is in turn expanded.

In view of the foregoing, it will be manifest that my invention provides a simplified portable tool for holding artificial teeth during the various processes of manufacture. Its construction is characterized by its structural simplicity, manufacturing economy, and operational reliability.

While I have described in detail the preferred embodiments of my invention, nevertheless, it will be understood that the same is subject to certain structural variation or modification without departing from the spirit of the invention or the scope of the following claims.

I claim:

1. A holder for the detachable reception of artificial teeth, comprising a relatively elongated handle, a substantially U-shaped tooth-mounting clip carried by one end of said handle, said clip including a pair of spaced legs joined by a connecting web, one of said legs being rigidly secured to said handle, the other of said legs being apertured to receive said handle and resiliently movable thereon and with respect to said rigid leg, a finger-engaging extension formed with said resiliently movable leg, and contractible and expansible means formed with said clip for resiliently engaging and retaining in connection therewith an artificial tooth, the operation of said means being controlled by the movement of said movable leg.

2. A holder for the detachable reception of artificial teeth, comprising a relatively elongated handle which terminates at one end in an angularly directed shank, a tooth-mounting clip provided on the shank end of said handle, said clip including a substantially U-shaped strip of resilient material formed to embody a pair of spaced legs and a connecting web, one of said legs being rigidly secured to said shank and the other of said legs being free for resilient movement longitudinally on said shank, and a bowed rib formed with the web of said clip, said rib being expansible and contractible by the movement of the free leg of said clip longitudinally on said shank, said rib being shaped to be received within the backing groove of an associated artificial tooth and exert frictional pressure on the walls of the tooth groove to retain such an artificial tooth in a definite position of mounting on said rib.

3. A holder for the detachable reception of artificial teeth, comprising a relatively elongated handle which terminates at one end in an angularly directed shank, a tooth-mounting clip provided on the shank end of said handle, said clip including a substantially U-shaped strip of resilient material formed to embody a pair of spaced legs and a connecting web, one of said legs being rigidly secured to said shank and the other of said legs being free for resilient movement longitudinally on said shank, a bowed rib formed with the web of said clip, said rib being expansible and contractible by the movement of the free leg of said clip longitudinally on said shank, said rib being shaped to be received within the backing groove of an associated artificial tooth and exert frictional pressure on the walls of the tooth groove to retain such an artificial tooth in a definite position of mounting on said rib, and shouldered means formed with said handle shank and engageable with the resiliently movable leg of the clip to retain the movable leg in a fixed position of adjustment relative to the shank.

JAMES R. KING.

REFERENCES CITED

The following references are of record in the file of this patent:

UNITED STATES PATENTS

| Number | Name | Date |
| --- | --- | --- |
| 789,415 | Dressel | May 9, 1905 |
| 1,197,648 | Meyers | Sept. 12, 1916 |
| 1,496,412 | Hamman | June 3, 1924 |